United States Patent [19]

Herting

[11] Patent Number: 5,256,431

[45] Date of Patent: * Oct. 26, 1993

[54] PATTERNED WAFFLES

[75] Inventor: Heinrich Herting, Herne, Fed. Rep. of Germany

[73] Assignee: Firma Karl Oexmann, Inh. Wolfgang Oexmann, Gelsenkirchen, Fed. Rep. of Germany

[*] Notice: The portion of the term of this patent subsequent to Jan. 7, 2009 has been disclaimed.

[21] Appl. No.: 908,448

[22] Filed: Jun. 30, 1992

Related U.S. Application Data

[60] Continuation of Ser. No. 755,640, Sep. 6, 1991, abandoned, which is a division of Ser. No. 750,276, Aug. 27, 1991, Pat. No. 5,142,967, which is a division of Ser. No. 609,386, Nov. 5, 1990, Pat. No. 5,079,015.

[30] Foreign Application Priority Data

Dec. 20, 1989 [DE] Fed. Rep. of Germany ....... 3941987
Jun. 9, 1990 [DE] Fed. Rep. of Germany ....... 4018513

[51] Int. Cl.$^5$ ............................................. A21D 13/00
[52] U.S. Cl. .................................... 426/249; 426/549
[58] Field of Search ............... 426/249, 496, 505, 523, 426/549; 99/372, 377, 380

[56] References Cited

U.S. PATENT DOCUMENTS 5,079,015 1/1992 Herting ............................. 426/249

FOREIGN PATENT DOCUMENTS 3817919 12/1988 Fed. Rep. of Germany .

Primary Examiner—George Yeung
Attorney, Agent, or Firm—Herbert Dubno; Andrew Wilford

[57] ABSTRACT

A method of making a waffle in a press having closable top and bottom halves comprises first spraying a relatively thin pattern batter in a pattern on one of the halves of the press and then heating the pattern batter sufficiently to at least partially cook it but insufficiently to make it peel off the one press half. A thick body batter of a color different from that of the pattern batter is then poured onto the bottom half and the halves of the press are closed together. Then the press halves and batters are heated so as to thoroughly cook the batters together into a waffle.

5 Claims, 2 Drawing Sheets

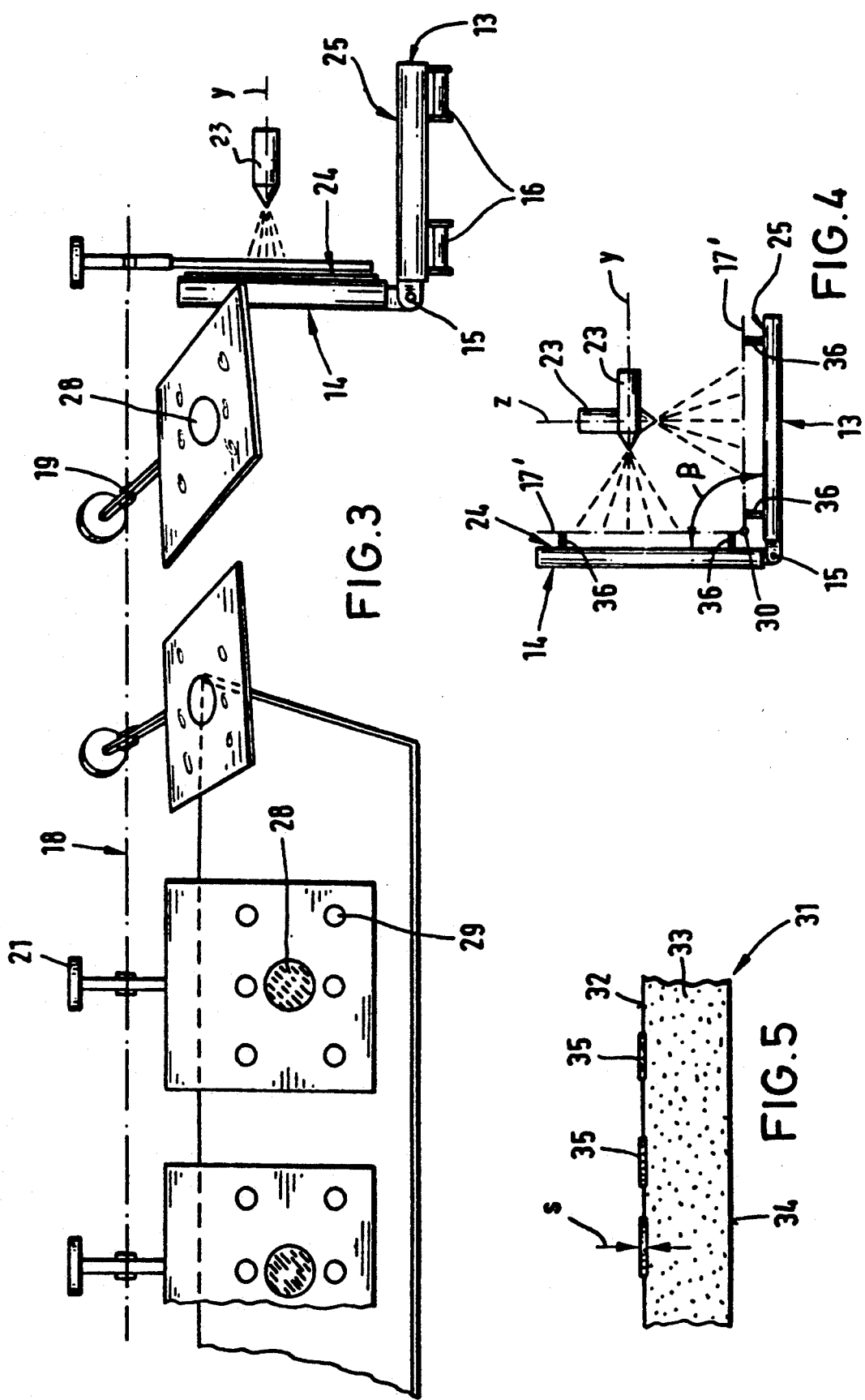

PATTERNED WAFFLES

This is a continuation of co-pending application Ser. No. 07/755,640 filed on 6 Sep. 1991, now abandoned; which is Division of Ser. No. 07/750,276—27 Aug. 1991 now U.S. Pat. No. 5,142,967, which is a Division of Ser. No. 07/609,386—5 Nov. 1990, now U.S. Pat. No. 5,079,015.

FIELD OF THE INVENTION

The present invention relates to the manufacture of waffles. More particularly this invention concerns the mass production of patterned waffles and the waffle produced thereby.

BACKGROUND OF THE INVENTION

A waffle is made by pouring a dose of batter onto one profiled plate of a waffle press that is formed by two such plates that are normally hinged together so that they can be closed on the batter and heated to cook the batter into a stiff waffle having opposite faces complementary to the respective faces of the plates of the press. The halves of the waffle press can be provided with their own heaters or entire can be put in an oven to cook the waffle.

In the mass production of waffles a succession of such presses are carried on an endless chain that passes through successive stations. At an upstream filling station the respective doses of batter are charged into the open presses, normally dumped atop the bottom half of each press which is arranged horizontal while the upper half is vertical. The presses are subsequently closed to compress the mass of batter and conform it to the shape of the press halves, and the presses move through a heating oven formed as a tunnel to bake the waffles. Then the presses are opened and the waffles are removed. The open presses can then pass through a cleaning station between the waffle-removing station and the filling station.

German patent 3,817,919 (based on an Austrian priority of 01 June 1987 and assigned to Franz Haas Waflemaschinenen Industrie GmbH) describes a mass-production method of making multicolored waffles. In one example two half portions of a batter comprising by weight 58.394 water, 38.93% wheat flour, 0.78% soy flower, 0.51% sugar, 0.39% lecithin, 0.16% baking soda, 0.08% salt, and 0.78% peanut oil are differently tinted with edible dyes and one of the portions is applied in a pattern on one face of an open waffle press, for instance in a spiral or circle. This portion is then heated for about 15 sec at about 170° C. to 190° C. and then the second portion is poured atop it and the press is closed. The closed press is then heated at the same temperature for 1.5 min to 2 min.

The result of this process is a multicolored waffle which can be sold as a novelty food item or that can be identified from the pattern as the product of a particular manufacturer. One face of the waffle can be colored differently from another or have a pattern that is different from that of the other, and by using chocolate or the like as coloring agent the colored portions can even have different flavors.

This procedure suffers from several drawbacks. First of all the cooking time for the first-applied pattern batter is not inconsiderable, so the mass-production operation must be slowed down since if the pattern batter is not sufficiently cooked the subsequently applied body batter will displace it. Furthermore it is impossible with this method to define a pattern or any fineness of detail, that is only coarse designs can be made.

OBJECTS OF THE INVENTION

It is therefore an object of the present invention to provide an improved system for making a multicolored waffle.

Another object is the provision of such an improved system for making a multicolored waffle which overcomes the above-given disadvantages, that is which is as fast as the prior-art monocolor system yet which can produce on the waffles patterns of considerable detail.

A further object is to provide an improved patterned waffle.

SUMMARY OF THE INVENTION

A method of making a waffle in a press having closable top and bottom halves according to this invention comprises first spraying a relatively thin pattern batter in a pattern on one of the halves of the press and then heating the pattern batter sufficiently to at least partially cook it but insufficiently to make it peel off the one press half. A thick body batter of a color different from that of the pattern batter is then poured onto the bottom half and the halves of the press are closed together. Then the press halves and batters are heated so as to thoroughly cook the batters together into a waffle.

Thus according to this invention the pattern batter, which is of a viscosity equal about to that cooking oil sprayed as a thin skin on the one press half so that it cooks, normally due purely to the latent heat in the metallic press half, virtually instantaneously. As a result immediately, normally no more than 1 sec and at most 3 sec to 5 sec, later the body battery is poured onto the bottom press half and the press is closed. It is important that the body batter be poured on and the press closed before the pattern dough starts to peel off or separate from the one press half, something that occurs naturally. As a result the colored pattern batter forms the desired pattern on the very surface of the waffle thus made. The body batter does surprisingly not get under the pattern batter to spoil the pattern, and its natural coolness prevents overcooking of the pattern batter.

Furthermore it is possible to produce a sharply defined pattern with the system of this invention. The pattern can be sprayed in spurts on the one press half, like an ink-jet printer, to form the desired pattern using a directable nozzle as spray head. It is possible in this manner to form a very well defined pattern, even to form legible writing on the surface of the waffle by moving the pattern-batter nozzle between emissions of individual bursts of pattern batter. In fact a moving or oscillating head is used to achieve a good coating of the one plate of the press.

The pattern batter according to the invention is sprayed from a spray head space from and directed at the one press half and a template is positioned between the spray head and the one press half so that the pattern of the pattern batter corresponds to holes in the template. This template is maintained at a spacing from the one press half during spraying of the pattern batter. In addition the press and template can be displaced synchronously through a spray station equipped with the spray head. To form a pattern on both faces of the waffle, two such spray heads are each directed at a respective press half through two such templates. In this arrangement the templates are displaced out from between the press halves immediately before pouring the body batter. The two template halves can be hinged together like the press halves and can be provided with spacers holding them offset from and parallel to the respective press halves. A template is particularly advantageous in a system where the presses are moving continuously and where the spray head is stationary, as it allows a very sharply defined pattern to be made even on a moving target.

In a mass-production operation a plurality of such presses and templates are employed. The templates are connected together by a chain that is advances by an appropriate transport mechanism to move them, like the presses, sequentially through a spraying station provided with the spray head. A guide is provided for pivoting the templates from a horizontal position upstream of the spraying station into a vertical position at the spraying station, the one press half being the top half. This guide is a nonstraight track and rollers on the templates engaged in the track. The templates are pivotal on the chain. A device is provided downstream of the spraying station for washing the templates.

The waffle according to this invention therefore has a thin skinlike outer layer of cooked pattern batter of a predetermined color and arranged in a predetermined pattern and a thick body of cooked batter of a color different from that of the outer layer. The thin outer layer is between 0.04 mm and 0.08 mm, preferably between 0.06 mm and 0,08 mm, thick and the pattern batter is in uncooked condition less viscous than the body batter. The pattern batter has between 4% and 6% by weight of baking soda or between 5% and 10% by weight of milk sugar so that, without the addition of any other coloring agent, it is naturally darker than the body batter when baked. Such a waffle can be rolled or otherwise shaped after it is baked to produce a three-dimensional shape, for instance for use as a cone for ice cream. The finished waffle can be as thin as 1 mm or as thick as 10 mm.

A batch of the pattern dough is made of 100 kg solid materials—for instance flour, sugar, and fat—to which is added 130 kg to 160 kg of water, preferably 140 kg to 150 kg. The same amount of solid materials is only added to 80 kg to 100kg of water for the body dough. Thus the body dough has only about two-thirds as much liquid as the pattern dough.

BRIEF DESCRIPTION OF THE DRAWING

The above and other objects, features, and advantages will become more readily apparent from the following, reference being made to the accompanying drawing in which:

FIGS. 2 and 3 are side views taken in the directions of respective arrows II and III of FIG. 1;

FIG. 4 is a large-scale side view through a spraying station according to the invention; and FIG. 5 is a large-scale section through a waffle according to this invention.

SPECIFIC DESCRIPTION

Figure 2:
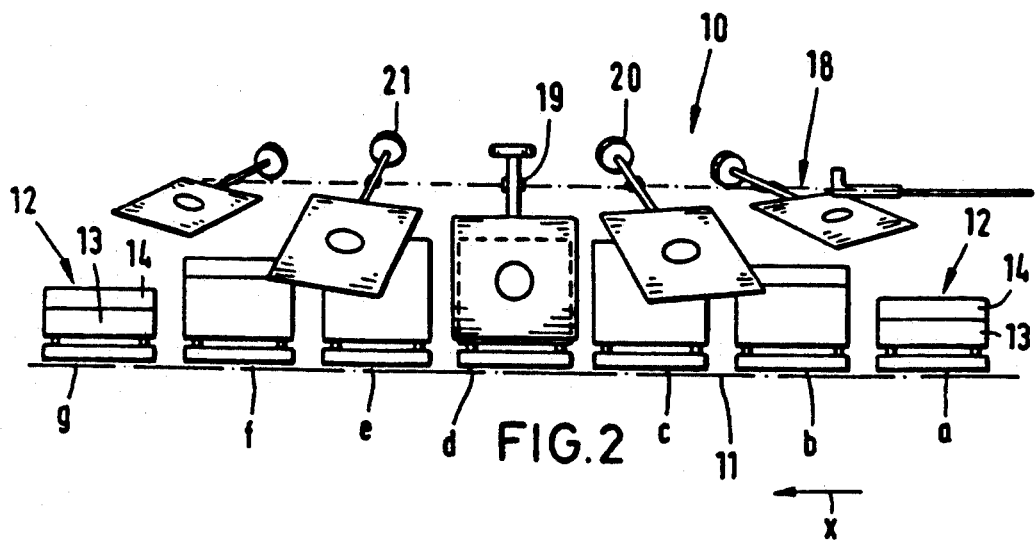
Figure 1:
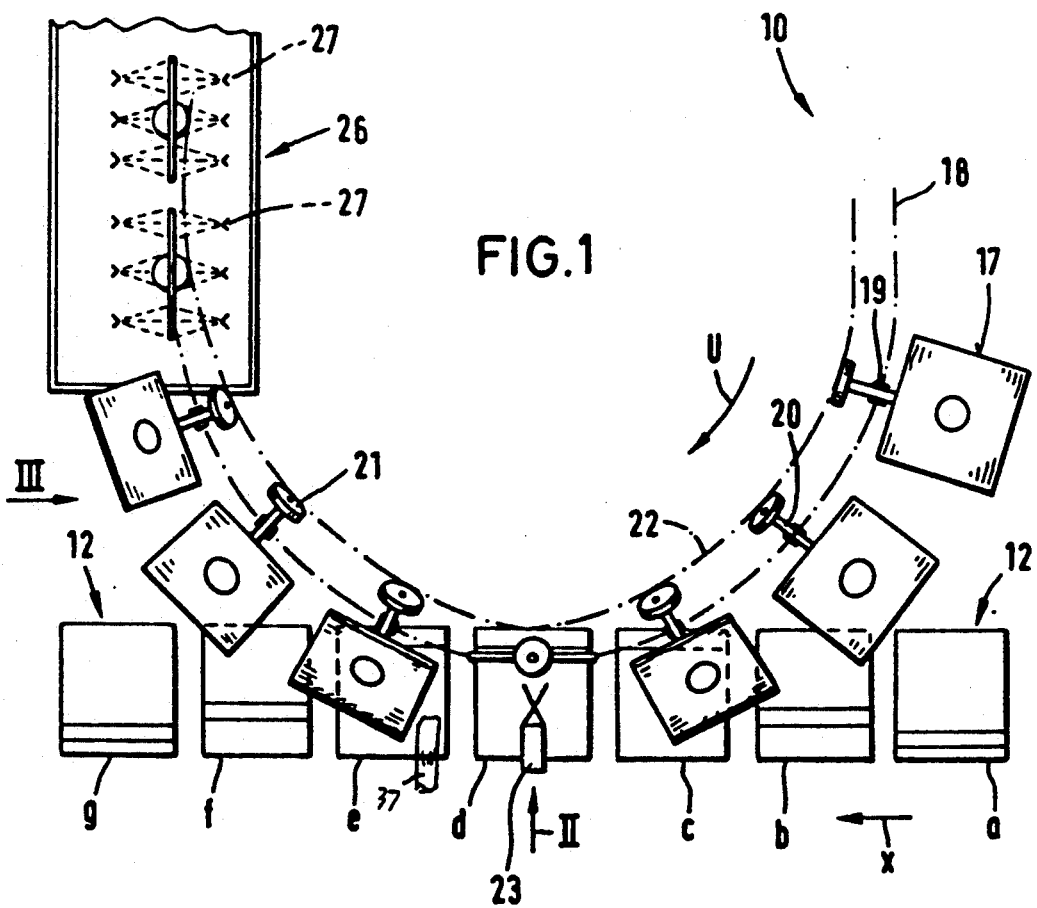
FIG. 1 is a ton view of the apparatus for carrying out the method of this invention.

As seen in FIGS. 1, 2, and 3 a waffle-making machine 10 has a chain stretch 11 extending in a transport direction x and carrying a plurality of two-part waffle presses 12 each comprising a bottom plate 13 having a profiled upper face 25 and a top plate 14 having a similar such face 24 and connected to the bottom plate 13 at a horizontal hinge 15. The chain 11 has links 16 to which the bottom plate 13 is fixed, but the top plate 14 can pivot between a vertical position forming a right angle with the bottom plate 13 and a horizontal position lying atop it. The presses 12 are moved sequentially, by the transport chain 11 through successive stations a through g. In stations a and g the presses 12 are closed, in stations b and f open, and in stations c, d, and e the are fully open as shown in side view at the right-hand end of FIG. 3. This opening and closing is effected by unillustrated means well known in the art.

A continuous chain illustrated at 18 carries a succession of templates 17 along an arcuate path (J that coincides at the station d with the path of the presses 12. Each template 17 is formed as a flat normally metallic plate with throughgoing holes 28 and 29 and is pivoted at 19 on the chain 18. In addition each template has a rod 20 projecting through the respective pivot 19 and having on its outer end a roller 21 that rides in a guide rail illustrated schematically at 22 and constructed to pivot the templates 17 so they are horizontal upstream of the station c, then pivot downward until they are vertical in the station d, and then pivot up through 180°. Thus when in the station d each template 17 is vertical and lies directly in front of the upper plate 14 of the press 12 in that station d. The chains 18 and 11 are advanced at exactly the same speed.

The station d is provided with a spray nozzle 23 directed horizontally along an axis y perpendicular to the face 24 of the press plate 14 and is connected to an unillustrated supply of a runny pattern dough. This nozzle 23 therefore can spray this thin dough at the plate 14 so that it passes only through the template 17 at the pattern holes 28 and 29, which can have virtually any desired configuration. It is possible also to move or oscillat this nozzle 23 as it is spraying. This forms a thin coating of dough on the surface 24 that cooks virtually instantaneously since the plates 13 and 14 are normally fairly not. Thereafter a nozzle shown at 37 in station e discharges a large quantity of a much more viscous body dough onto the lower plate 13 and the press is closed and is moved off through a standard baking tunnel (not shown) to finish cooking the waffle thus formed. Subsequently the waffles are stripped from the presses 12 and they are recirculated.

FIG. 4 shows how it is possible to use a template comprised of two plates 17' hinged together at 30 and provided with spacers 36 to hold them off the respective press faces 24 and 25. In this arrangement two nozzles 23 are provided, one centered on the horizontal axis y at the upright template plate 17' and the other on a vertical axis z at the horizontal plate 17'.

After being pulled out of the presses 12, the templates 17 are passed through a cleaning device 26 having sprays 27 that wash any batter off them. Since these templates 17 are not hot, the batter does not cook and is, therefore, easy to wash off.

The waffle 31 thus produced as shown in FIG. 5 has a body 33 with an upper surface 32 and a lower surface 34. The upper surface 32, which is complementary to the press face 24, has spots 35 of a thickness s equal to 0.05 mm of the pattern dough and in a pattern corresponding exactly to that of the holes 28 and 29 of the template 17.

I claim:
1. A waffle comprising:
   a thin skinlike outer layer of cooked pattern batter of a predetermined color, of a thickness of between

0.04 mm and 0.08 mm, and arranged in a predetermined pattern; and a thick body of cooked battery of a color different from that of the outer layer, the body and thin layer having an overall thickness of between 1 mm and 10 mm.

2. The waffle defined in claim 2 wherein the pattern batter has a thickness between 0.06 mm and 0.08 mm.

3. The waffle defined in claim 2 wherein the pattern batter has between 4% and 6% by weight of baking soda.

4. The waffle defined in claim 2 wherein the pattern batter has between 5% add 10% by weight of milk sugar.

5. A waffle produced in a press having closable top and bottom halves by:
- spraying a relatively runny pattern battery in a pattern on one of the halves of the press;
- heating the pattern batter sufficiently to at least partially cook it but insufficiently to make it peal off the one press half;
- pouring onto the bottom half a viscous body battery of a color different from that of the pattern batter;
- closing the halves together; and
- heating the batters and thereby thoroughly cooking the batters together into a waffle.

* * * * *